(12) United States Patent
Konishi et al.

(10) Patent No.: US 11,066,946 B2
(45) Date of Patent: Jul. 20, 2021

(54) AXIAL TURBOMACHINERY

(71) Applicant: MITSUBISHI HEAVY INDUSTRIES, LTD., Tokyo (JP)

(72) Inventors: Eiji Konishi, Tokyo (JP); Yoshihiro Kuwamura, Tokyo (JP); Kazuyuki Matsumoto, Tokyo (JP); Shinji Fukao, Tokyo (JP); Hideaki Sugishita, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 37 days.

(21) Appl. No.: 16/487,200

(22) PCT Filed: Feb. 23, 2018

(86) PCT No.: PCT/JP2018/006802
§ 371 (c)(1),
(2) Date: Aug. 20, 2019

(87) PCT Pub. No.: WO2018/155652
PCT Pub. Date: Aug. 30, 2018

(65) Prior Publication Data
US 2019/0376403 A1    Dec. 12, 2019

(30) Foreign Application Priority Data
Feb. 23, 2017    (JP) .............................. JP2017-032371

(51) Int. Cl.
*F01D 11/08* (2006.01)
*F01D 5/20* (2006.01)
(Continued)

(52) U.S. Cl.
CPC ................ *F01D 11/08* (2013.01); *F01D 5/20* (2013.01); *F01D 9/04* (2013.01); *F16J 15/447* (2013.01); *F05D 2240/307* (2013.01)

(58) Field of Classification Search
CPC ....... F01D 11/08; F01D 5/20; F05D 2240/307
See application file for complete search history.

(56) References Cited

U.S. PATENT DOCUMENTS

| 4,662,820 A * | 5/1987 | Sasada ................. F04D 29/161 |
|  |  | 415/173.6 |
| 9,260,972 B2 * | 2/2016 | Zelesky ................. F01D 5/18 |

(Continued)

FOREIGN PATENT DOCUMENTS

| CN | 102042043 A | 5/2011 |
| CN | 103228871 A | 7/2013 |

(Continued)

OTHER PUBLICATIONS

International Search Report dated Apr. 17, 2018, issued in counterpart Application No. PCT/JP2018/006802, with English translation. (4 pages).

(Continued)

*Primary Examiner* — Eldon T Brockman
(74) *Attorney, Agent, or Firm* — Westerman, Hattori, Daniels & Adrian, LLP

(57) ABSTRACT

In an axial turbomachinery related to the invention, a structural body has a casing fin, a blade is provided with an upstream inclined surface that is inclined from an upstream side toward a downstream side, the structural body is provided with an upstream inclined inner wall surface that is inclined from the upstream side the downstream side, an inclination angle of the upstream inclined surface with respect to a central axis of relative rotation between the blade and the structural body is larger than an inclination angle of the upstream inclined inner wall surface with respect to the central axis, and an end position of the upstream inclined surface on a radially inner side is located (Continued)

radially outside an end position of the upstream inclined inner wall surface on the radially inner side.

5 Claims, 3 Drawing Sheets

(51) Int. Cl.
*F01D 9/04* (2006.01)
*F16J 15/447* (2006.01)

(56) References Cited

U.S. PATENT DOCUMENTS

| | | | | |
|---|---|---|---|---|
| 10,316,675 | B2* | 6/2019 | Kuwamura | F16J 15/4472 |
| 2011/0070074 | A1 | 3/2011 | Schabowski et al. | |
| 2011/0085892 | A1 | 4/2011 | John et al. | |
| 2012/0121393 | A1 | 5/2012 | Kuwamura et al. | |
| 2013/0129493 | A1* | 5/2013 | Matsumoto | F01D 5/12 |
| | | | | 415/191 |
| 2013/0251534 | A1 | 9/2013 | Matsumoto et al. | |
| 2013/0272855 | A1* | 10/2013 | Kuwamura | F01D 11/04 |
| | | | | 415/173.5 |
| 2014/0010650 | A1* | 1/2014 | Zelesky | F01D 5/18 |
| | | | | 416/1 |
| 2014/0154061 | A1* | 6/2014 | Kuwamura | F01D 5/225 |
| | | | | 415/173.1 |
| 2015/0260042 | A1* | 9/2015 | Nishijima | F01D 11/02 |
| | | | | 415/144 |
| 2016/0130965 | A1* | 5/2016 | Yamaguchi | F01D 11/08 |
| | | | | 415/13 |
| 2016/0333714 | A1 | 11/2016 | Matsumoto et al. | |
| 2017/0022838 | A1* | 1/2017 | Kuwamura | F01D 5/225 |
| 2017/0370237 | A1* | 12/2017 | Kuwamura | F01D 11/02 |
| 2018/0355979 | A1* | 12/2018 | Nishikawa | F01D 5/225 |

FOREIGN PATENT DOCUMENTS

| | | |
|---|---|---|
| CN | 104204419 A | 12/2014 |
| EP | 2657452 A1 | 10/2013 |
| JP | 51-014402 A | 1/1986 |
| JP | 63-097804 A | 4/1988 |
| JP | H10-311205 A | 11/1998 |
| JP | 2007-138864 A | 6/2007 |
| JP | 2009-243287 A | 10/2009 |
| JP | 2011-080452 A | 4/2011 |
| JP | 2011-085138 A | 4/2011 |
| JP | 2012-072689 A | 4/2012 |
| JP | 2015-169077 A | 9/2015 |

OTHER PUBLICATIONS

Written Opinion dated Apr. 17, 2018, issued in counterpart Application No. PCT/JP2018/006802, with English ranslation. (9 pages).

* cited by examiner

AXIAL TURBOMACHINERY

TECHNICAL FIELD

The present invention relates to an axial turbomachinery.

Priority is claimed on Japanese Patent Application No. 2017-032371, filed Feb. 23, 2017 the content of which is incorporated herein by reference.

BACKGROUND ART

As a type of steam turbine that is an axial turbomachinery, one is known that includes a casing, a rotating shaft that is rotatably provided with respect to the casing, a stator blade that is fixed to an inner peripheral part of the casing, and plurality of stages of rotor blades that are radially provided in the rotating shaft on a downstream side of this stator blade.

This steam turbine is roughly classified into an impulse turbine and a reaction turbine depending on differences in operation method. In the impulse turbine, the stator blade has a nozzle shape, steam, which has passed through the stator blade, is jetted to the rotor blades, and the rotor blades rotates only by an impact force received from the steam. On the other hand, in the reaction turbine, the shape of the stator blade is the same as that of the rotor blades, and the rotor blade rotate by the impact force received from the steam that has passed through the stator blade, and a reaction force against expansion of the steam generated when passing through the rotor blades.

However, in such a steam turbine, a gap with a predetermined width in a radial direction is formed between a distal end of each rotor blade and the casing, and a gap with a predetermined width in the radial direction is also between a distal end of the stator blade and the rotating shaft. Then, a portion of the steam that flows along a rotational axis of the rotating shaft leaks to a downstream side through the gap of the distal end of the rotor blade or the stator blade.

Here, since the steam leaking from the gap between the rotor blade and the casing to the downstream side applies neither the impact force nor the reaction force to the rotor blade, the steam does not apply a driving force that rotates the rotor blade. Additionally, the steam leaking from the gap between the stator blade and the shaft body to the downstream side does not change in speed even if the steam passes over the stator blade, and does not cause expansion, either. Therefore, this steam does not apply a driving force for rotating the rotor blade on the downstream side. Therefore, In order to improve the performance of the steam turbine, it is important to reduce the amount of leakage of the steam in the gap of the distal end of the rotor blade or the stator blade.

Thus, a seal fin is used as means for preventing the steam from leaking from the gap of the distal end of the rotor blade or the stator blade. Here, an example of the seal fin is disclosed in PTL 1. The seal fin of PTL 1 is provided so as to extend from the casing toward a shroud of the rotor blade, and the shroud of the rotor blade has a step shape.

CITATION LIST

Patent Literature

[PTL 1] Japanese Unexamined Patent Application, First Publication, First Publication No. 2012-72689

DISCLOSURE OF INVENTION

Technical Problem

In PTL 1, at an inlet part of the cavity between the seal fin and the step of the shroud, the leak flow branches from the main flow, and flows in a direction orthogonal to the flow of the main flow. That is, there is a possibility that that the leak flow will branch in a direction completely different direction from the main flow, and loss occurs when the leak flow branches.

Thus, the invention provides a high-efficiency axial turbomachinery that suppresses a loss resulting from branching of a leak flow.

Solution to Problem

A first aspect of the present invention is an axial turbomachinery which includes a blade that is disposed in a flow channel through which a main flow of a fluid flows and has a shroud at a distal end thereof; and a structural body that is provided via a gap on a distal side of the blade and is configured to rotate relative to the blade. The structural body has an contraction flow member that protrudes toward the shroud to form a minute gap between the contraction flow member and the shroud. The blade has an upstream inclined surface on amend surface of the shroud facing the upstream side, the upstream inclined surface being inclined from an upstream side to a downstream side toward a radially outer side, and the structural body is provided with an upstream inclined inner wall surface that is disposed on the upstream side of the shroud and is inclined from the upstream side toward the downstream side toward a radially outer side, at a position facing the shroud in a direction in which the main flow flows.

According to such an axial turbomachinery, at an inlet of a cavity between the structural body and the blade, the shroud is provided with an upstream inclined surface, and the structural body is provided with an upstream inclined inner wall surface. For this reason, the leak flow branching from the main flow and flowing into the cavity is not straight in the radial direction, and flows obliquely toward the downstream side along the upstream inclined surfaces and the upstream inclined inner wall surface. Therefore, the leak flow when the leak flow branches from the main flow does not branch in a direction completely different from the main flow. Moreover, since it is possible to avoid that a corner part is formed within the cavity by the upstream inclined surface and the upstream inclined inner wall surface, generation of a dead wall region can be suppressed. As a result, flaking of the fluid can be suppressed and loss can be reduced.

Moreover, the fluid that flows along the upstream inclined surface comes into contact with the contraction flow member, and flows so as to be pushed back toward the upstream side. As a result, a vortex is formed on the upstream side of the contraction flow member within the cavity. Then, since the vortex is formed so as to extend obliquely along the upstream inclined surfaces and the upstream inclined inner wall surface, the vortex is formed in a flow direction of the leak flow branching from the main flow. Therefore, formation of a fine vortex is formed around the vortex can be suppressed, and occurrence of shaft vibration in the rotary machine can be suppressed.

In a second aspect of the present invention which is the axial turbomachinery according to the above first aspect, an inclination angle of the upstream inclined surface with respect to a central axis of relative rotation between the blade and the structural body may be larger than an inclination angle of the upstream inclined inner wall surface with respect to the central axis.

By setting the inclination angle in this way, flaking of the fluid that flows along the upstream inclined surface of the shroud is promoted as much as possible, and the flaked fluid can be guided to and brought into contact with a root of the contraction flow member. As a result, the leak flow does not flow into the minute gap of the distal end of the contraction flow member as it is, and the flow rate of the leak flow can be reduced.

In a third aspect of the present invention which is the axial turbomachinery according to the above first or second aspect, an end position of the upstream inclined surface on the radially inner side may be located radially outside an end position of the upstream inclined inner wall surface on the radially inner side.

By forming the upstream inclined surface and the upstream inclined inner wall surface in this way, the vortex formed on the upstream side of the contraction flow member at the inlet part of the cavity between the structural body and the blade an be largely formed along the flow direction of the leak flow branching from the main flow, formation of a fine vortex around this vortex can be suppressed, and occurrence of vibration in the rotary machine can be suppressed.

In a fourth aspect of the present invention which is the axial turbomachinery according to any of the above first to third aspects, the upstream inclined surface may have a curved concave surface that forms a concave shape toward the downstream side.

By forming the curved concave surface as the upstream inclined surface, the upstream inclined surface can be made to follow the shape of the vortex formed at the inlet part of the cavity between the structural body and blade. Therefore, the friction loss between the vortex and the upstream inclined surface can be reduced.

In a fifth aspect of the present invention which is the axial turbomachinery according to any of the above first to fourth aspects, the blade may have an downstream inclined surface on an end surface of the shroud facing the downstream side, the downstream inclined surface being inclined from the upstream side to the downstream side toward the radially inner side, and the structural body may be provided with a downstream inclined inner wall surface that is disposed on the downstream side of the shroud and is inclined from the upstream side toward the downstream side toward the radially inner side, at a position facing the shroud in the direction in which the main flow flows.

In this way, at the outlet part of the cavity between the structural body and the blade, the shroud is provided with the downstream inclined surface, and the structural body is provided with the downstream inclined inner wall surface. For this reason, when the leak flow tries to join the main flow, the leak flow is not straight in the radial direction, and flows obliquely into the main flow toward the downstream side along the downstream inclined surface and the downstream inclined inner wall surface. Therefore, when the leak flow joins the main flow, the flow direction can be brought as close as possible. Moreover, since it is possible to avoid that a corner part is formed within the cavity by the downstream inclined surface and the downstream inclined inner wall surface, generation of a dead wall region can be suppressed. As a result, flaking of the fluid can be suppressed and loss can be reduced.

In a sixth aspect of the present invention which is the axial turbomachinery according to the above fifth aspect, an end position of the downstream inclined surface on the radially outer side may be located radially outside an end position of the downstream inclined inner wall surface on the radially inner side.

By forming the downstream inclined surface and the downstream inclined inner wall surface in this way, the vortex formed on the downstream side of the contraction flow member at the outlet part of the cavity between the structural body and the blade an be largely formed along the flow direction of the leak flow branching from the main flow, formation of a fine vortex around this vortex can be suppressed, and occurrence of vibration in the rotary machine can be suppressed.

In a seventh aspect of the present invention which is the axial turbomachinery according to the above fifth or second aspect, the downstream inclined surface may have a curved convex surface that forms a convex shape toward the downstream side.

By such a curved convex surface, after the leak flow that flows along the surface of the shroud flakes from the surface of the shroud at the outlet part of cavity between the structural body and the blade, does not flow straight toward the downstream side, but flows obliquely in the radial direction without flaking from the curved convex surface to some extent, the leak flow can be made to join the main flow. Therefore, by appropriately designing the shape of the curved convex surface, the leak flow can be made to join the main flow so as to follow the flow direction of the main flow while avoiding that the leak flow is made to directly flow into a downstream adjacent blade. Therefore, it is possible to reduce mixed loss of the leak flow to the main flow.

In an eighth aspect of the invention which is the axial turbomachinery according to the above seventh aspect, the curved convex surface may be a rounded surface, and a curvature radius of the rounded surface may be smaller than ½ of the radial dimension of the end surface of the shroud facing the downstream side.

By setting the curvature radius of the rounded surface, the leak flow can be made not to flow straight toward the downstream side, but made to flow obliquely in the radial direction without flaking from the curved convex surface to some extent and join the main flow.

Therefore, it is possible to make the leak flow join the main flow so as to follow the flow direction of the main flow while avoiding that the leak flow is made to directly flow to the blade to the downstream side.

Solution to Problem

According to the above axial turbomachinery by virtue of an upstream inclined surface and an upstream inclined inner wall surface at the inlet part of the cavity between the structural body and a blade, the loss resulting from the branching of the leak flow from the main flow can be suppressed, and high performance can be achieved.

BEST MODE FOR CARRYING OUT THE INVENTION

First Embodiment

Hereinafter, a steam turbine (axial turbomachinery) 100 of a first embodiment of the invention will be described.

Figure 1:
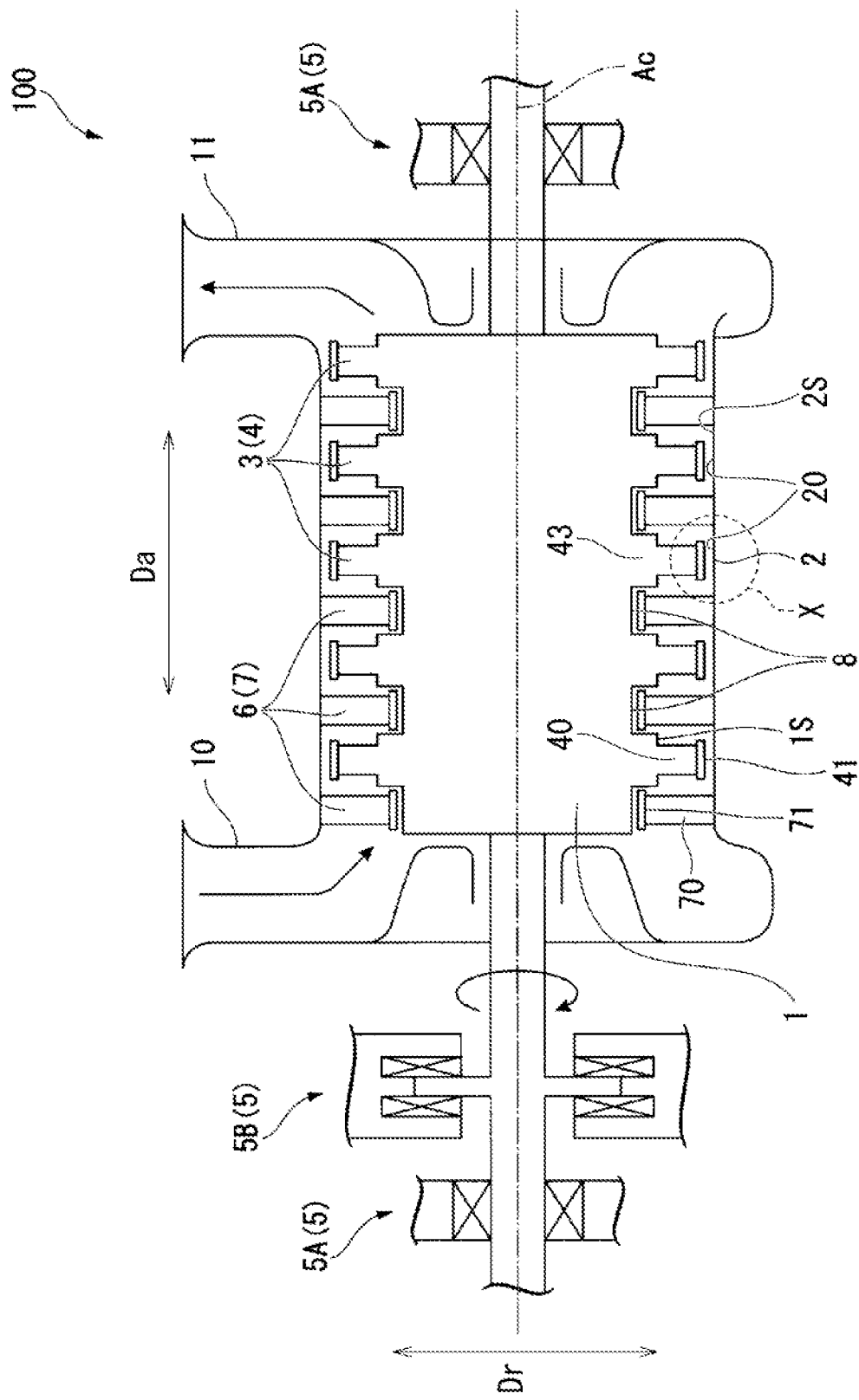
FIG. 1 is a sectional view of a schematic configuration of a steam turbine of a first embodiment of the invention.

As illustrated in FIG. 1, the steam turbine 100 related to the present embodiment includes a rotating shaft (structural body) 1, a casing (structural body) 2, a rotor blade stage 3 having a plurality of rotor blades (blades) 4, and a stator blade stage 6 having a plurality of stator blades (blades) 7.

The rotating shaft 1 has a columnar shape that extends along a central axis Ac. The rotating shaft 1 is supported such that both ends thereof in a central axis direction Da along the central axis Ac are rotatable around the central axis Ac by a bearing device 5, The bearing device 5 has a journal bearing 5A provided on each of both sides of the rotating shaft 1 in the central axis direction Da, and a thrust bearing 5B provided only on a first axis in the central axis direction Da. The journal bearing 5A supports a load in a radial direction Dr caused by the rotating shaft 1. The thrust bearing 5B supports a load in the central axis direction Da caused by the rotating shaft 1.

The casing 2 has a tubular shape that extends in the central axis direction Da. The casing 2 covers the rotating shaft 1 from an outer peripheral side, and rotates relative to the rotating shaft 1.

The casing 2 includes an intake port 10 and an exhaust port 11. The intake port 10 is formed on the first axis of the casing 2 in the central axis direction Da, and takes in steam (working fluid) into the casing 2 from the exterior. The exhaust port 11 is formed on a second side of the casing 2 in the central axis direction Da, and exhausts the steam, that has passed through the interior of the casing 2, to the exterior.

In the subsequent description, a side in that the intake port 10 is located as seen from the exhaust port 11 is referred to as an upstream side, and a side in that the exhaust port 11 is located as seen from the intake port 10 is referred to as a downstream side.

A plurality of the rotor blade stages 3 are provided at intervals from the first axis toward the second side in the central axis direction Da on an outer peripheral surface 1S of the rotating shaft 1. Each rotor blade stage 3 has a plurality of rotor blades 4 arranged at intervals in a circumferential direction around the central axis Ac on the outer peripheral surface 1S of the rotating shaft 1.

Figure 2:
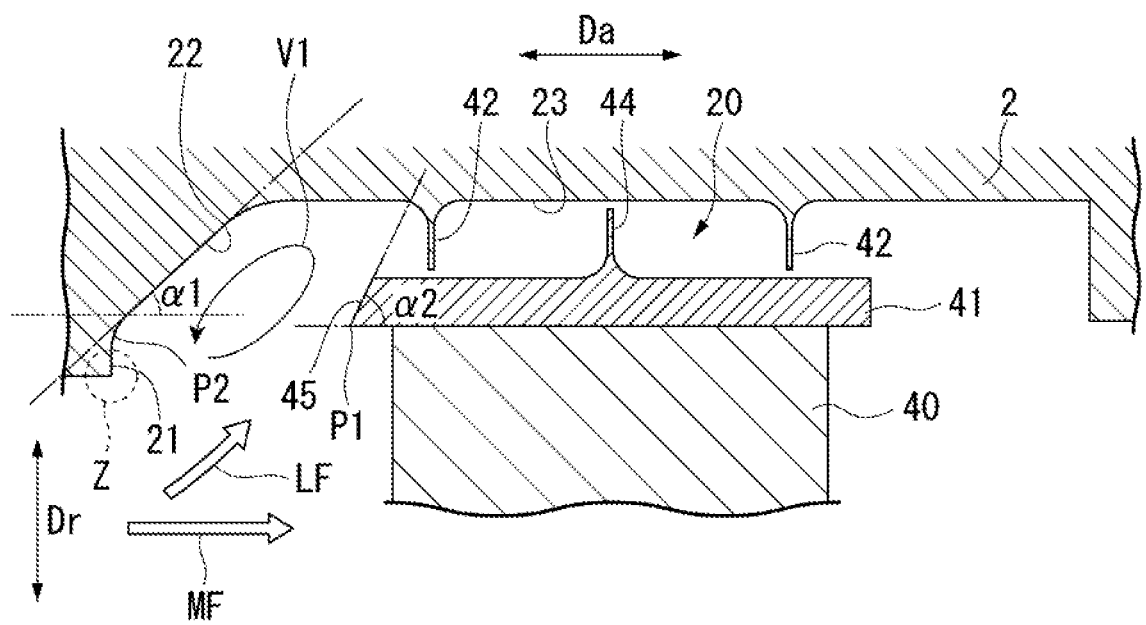
FIG. 2 is a view illustrating main parts of the steam turbine related to the first embodiment of the invention and illustrating portion X of FIG. 1.

As illustrated in FIG. 2, each rotor blade 4 has a platform 43 provided in the outer peripheral surface 1S of the rotating shaft 1, a rotor blade main body 40, and a rotor blade shroud 41.

Although not illustrated in detail, the rotor blade main body 40 is formed so as to extend radially outward from the platform 43. The rotor blade main body 40 has an airfoil-shaped cross-section as seen from the radial direction Dr.

The rotor blade shroud 41 is provided at a radially outer end of the rotor blade main body 40. The rotor blade shroud 41 is set such that the dimension thereof in the central axis direction Da is larger than the dimension of the rotor blade main body 40 in the central axis direction Da.

A rotor-blade housing recess 20 for housing the rotor blade shroud 41 is formed in a region, that faces the rotor blade shroud 41 in the radial direction Dr, on an inner peripheral side of the casing 2. The rotor-blade housing recess 20 has a groove shape that is recessed outward in the radial direction Dr from the inner peripheral surface 2S of the casing 2 and is continuous in the circumferential direction around the central axis Ac.

Casing fins (contraction flow members) 42 (two in the present embodiment), that protrude from the casing 2 toward the rotor blade shroud 41, are provided so as to be arranged by being spaced apart from each other in the central axis direction Da on a bottom surface 23 surface that faces an inner side in the radial direction Dr) of the rotor-blade housing recess 20. The casing fins 42 have a thin plate shape that extends inward in the radial direction Dr from the casing 2. A clearance (minute gap) is formed in the radial direction Dr between a distal end of each casing fin 42 and the rotor blade shroud 41. In addition, the shape of the casing fin 42 is not limited to the thin plate shape and may have, for example, a block shape.

A shroud fin 44 (one in the present embodiment), that protrudes from a central part of the rotor blade shroud 41 in the central axis direction Da toward the casing 2, is provided in the rotor-blade housing recess 20 so as to be sandwiched by the casing fins 42 from the upstream side and the downstream side in the central axis direction Da. The shroud fin 44 has a thin plate shape that extends outward in the radial direction Dr from the rotor blade shroud 41. The clearance (minute gap) is formed in the radial direction Dr between the distal end of the shroud fin 44, and the casing 2.

As illustrated in FIG. 1, a plurality of the stator blade stages 6, are provided at intervals in the central axis direction Da on the inner peripheral surface of the casing 2. Each stator blade stage 6 is disposed on the upstream side of each rotor blade stage 3. Each stator blade stage 6 has the plurality of stator blades 7 arranged at intervals in the circumferential direction around the central axis Ac.

Each stator blade 7 includes a stator blade main body 70 and a stator blade shroud 71.

The stator blade main body 70 is provided so as to extend inward in the radial direction Dr from the inner peripheral surface 2S of the casing 2. The stator blade main body 70 has an airfoil-shaped cross-section as seen from the radial direction Dr.

The stator blade shroud 71 is attached to an inner end of the stator blade main body 70 in the radial direction Dr.

A grooved stator-blade housing recess 8, that is recessed inward in the radial direction Dr from the outer peripheral surface 1S of the rotating shaft 1 and is continuous in the circumferential direction around the central axis Ac, is formed on the upstream side of each rotor blade stage 3 on the outer peripheral surface 1S of the rotating shaft 1 facing outward in the radial direction Dr. The stator blade shroud 71 of each stator blade 7 is housed within the stator-blade housing recess 8.

Next, the rotor-blade housing recess 20 and the rotor blade shroud 41 will be described in detail with reference to FIG. 2.

The rotor-blade housing recess 20 is a so-called cavity formed between the rotor blade shroud 41 and the casing 2. A leak flow LF, which has branched in the radial direction from a main flow MF of the steam that flows in the central axis direction Da around the rotating shaft 1, flows into this cavity. A surface of the rotor-blade housing recess 20 facing the downstream side, and an end surface of the rotor blade shroud 41 facing the upstream side are disposed with a gap by being spaced apart from each other in the radial direction, that is, the surface of the rotor-blade housing recess 20 facing the downstream side is disposed on the upstream side of the end surface of the rotor blade shroud 41 facing the upstream side so as to face the rotor blade shroud 41. This gap serves as an inlet part of the cavity.

Also, the rotor-blade housing recess 20 that is a inner surface of the casing 2 has a flat surface 21 that extends in the radial direction Dr so as to be orthogonal to the central axis Ac on the inner side in the radial direction Dr and an upstream inclined inner wall surface 22 that is inclined so as to face the downstream side toward the outer side in the radial direction Dr continuously with the outer side of the flat surface 21 in the radial direction Dr, as surfaces facing the downstream side. A connection portion between the upstream inclined inner wall surface 22 and the flat surface 21 is smoothly connected in a circular-arc shape without a corner. Additionally, a connection portion between the above bottom surface 23 of the rotor-blade housing recess 20 and the upstream inclined inner surface 22 is also smoothly connected in a circular-arc shape without a corner.

Here, the upstream inclined inner wall surface 22 may be formed by attaching a separate member to the rotor-blade housing recess 20, or may be provided by forming the surface of the rotor-blade housing recess 20 in the shape of an inclined surface.

The end surface of the rotor blade shroud 41 facing the upstream side forms a planar upstream inclined surface 45 that is inclined so as to face the downstream side toward the outer side in the radial direction Dr.

In the present embodiment, an inclination angle $\alpha 2$ of the upstream inclined surface 45 with respect to the central axis Ac is larger than an inclination angle $\alpha 1$ of the upstream inclined inner wall surface 22 with respect to the central axis Ac. Additionally, an end position P1 of the upstream inclined surface 45 on the inner side in the radial direction Dr, that is, the end position P1 of the rotor blade shroud 41 on the inner side in the radial direction Dr, is located radially outside an end position P2 of the upstream inclined inner wall surface 22 on the inner side in the radial direction.

As described above, according to the steam turbine 100 of the present embodiment, at the inlet part of the cavity between the casing 2 and the rotor blade shroud 41, the rotor blade shroud 41 is provided with the upstream inclined surface 45, and the casing 2 is provided with the upstream inclined inner wall surface 22. For this reason, the leak flow LF to branch from the main flow MF of the steam and flow into the cavity is not straight toward the outer side in the radial direction Dr, and flows in obliquely toward the downstream side along the upstream inclined surfaces 45 and the upstream inclined inner wall surface 22.

Therefore, the leak flow LF when the leak flow LF branches from the main flow MF does not branch in a direction completely different from the main flow MF. Moreover, since it is possible to avoid that a corner part is formed within the rotor-blade housing recess 20 by the upstream inclined surface 45 and the upstream inclined inner wall surface 22, generation of a dead wall region can be suppressed. As a result, flaking of the steam can be suppressed and loss can be reduced. Accordingly, the loss resulting from the branching of the leak flow LF from the main flow MF can be suppressed, and high performance of the steam turbine 100 can be achieved.

Moreover, the steam that flows along the upstream inclined surface 45 comes into contact with a casing fin 42, and flows so as to be pushed back toward the upstream side. As a result, a vortex V1 (refer to FIG. 2) is formed on the upstream side of the casing fin 42 within the cavity. Also, the vortex V1 is formed so as to extend obliquely toward the downstream side toward the outer side in the radial direction Dr along the upstream inclined surface 45 and the upstream inclined inner wall surface 22. For this reason, the vortex V1 is formed in a flow direction of the leak flow LF branching from the main flow MF. Therefore, formation of a fine vortex is formed around the vortex V1 can be suppressed, and occurrence of shaft vibration in the rotating shaft 1 can be suppressed.

In the present embodiment, "Inclination angle of upstream inclined inner wall surface 22: $\alpha 1$"<"Inclination angle of upstream inclined surface 45: $\alpha 2$" are established. For this reason, by allowing the steam to flow obliquely while securing a radial component of the steam that flows along the upstream inclined surface 45 of the rotor blade shroud 41, the flaking of the steam at the end of the upstream inclined surface 45 on the outer side in the radial direction Dr can be promoted.

The flaked steam can be guided to and brought into contact with a root of the most upstream casing fin 42. As a result, the leak flow LF does not flow into the minute gap of a distal end of the casing fin 42 as it is, and the flow rate of the leak flow LF, that passes through the cavity and joins the main flow MF from the downstream side (outlet part) of the cavity, can be reduced by pushing back leak flow LF to the upstream side by the casing fin 42.

In the present embodiment, the end position of the upstream inclined surface 45 on the inner side in the radial direction is located radially outside the end position of the upstream inclined inner wall surface 22 on the outer side in the radial direction. For this reason, the above vortex V1 formed at the inlet part of the cavity can be largely formed along the flow direction of the leak flow LF branching from the main flow MF. Therefore, formation of a fine vortex is formed around the vortex V1 can be suppressed, and occurrence of shaft vibration in the rotating shaft 1 can be suppressed.

Here, in a case where the surface of the rotor-blade housing recess 20 facing the downstream side is not provided with the flat surface 21, but the surface of the rotor-blade housing recess 20 facing faces the downstream side is composed only of the upstream inclined inner wall surface 22, there is a possibility that the vortex V1 extends up to the inner side in the radial direction Dr (refer to a portion Z of FIG. 2), and the vortex V1 develops up to the stator blade 7 on a preceding stage and affects the main flow MF in the stator blade. Occurrence of such a phenomenon can be suppressed by the flat surface 21 connected to the upstream inclined inner wall surface 22 being provided. However, the flat surface 21 may not be provided.

Second Embodiment

Next, a steam turbine (axial turbomachinery) 200 of a second embodiment of the invention will be described. Since the second embodiment described below is different from the first embodiment only in an upstream inclined surface 45A, the same portions as those in the first embodiment will be described with the same reference signs, and duplicate descriptions will be omitted.

Figure 3:
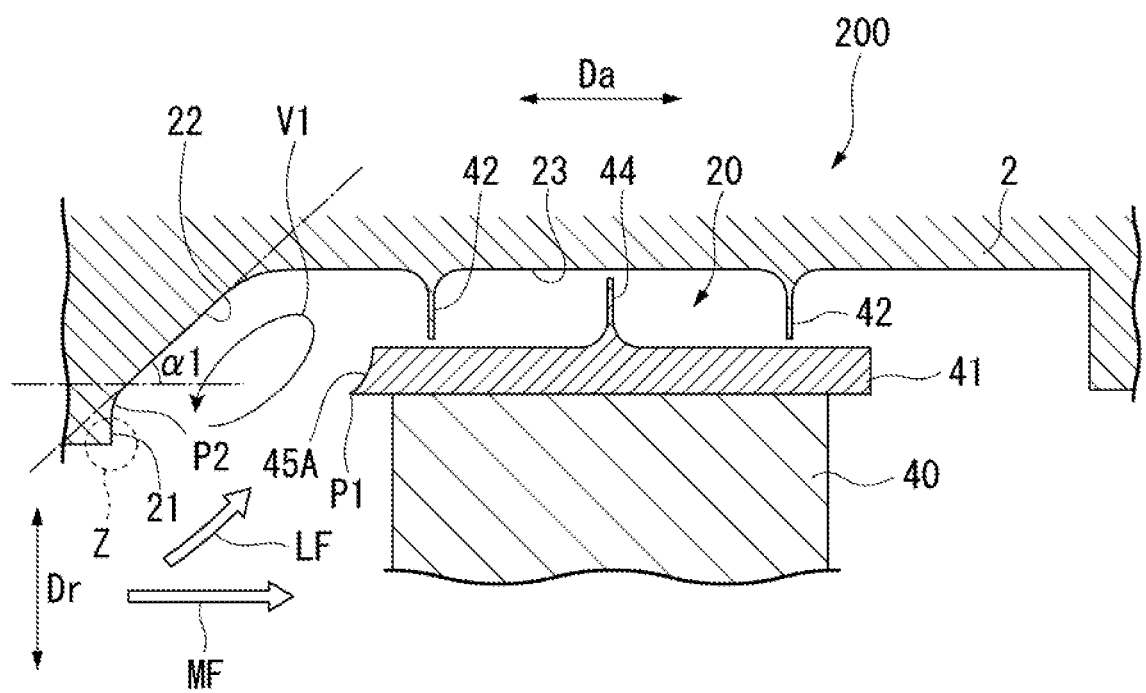
FIG. 3 is a view illustrating main parts of a steam turbine related to a second embodiment of the invention and illustrating a position equivalent to the portion X of FIG. 1.

As illustrated in FIG. 3, the end surface of the rotor blade shroud 41 facing the upstream side forms the upstream inclined surface 45A that is inclined so as to face the downstream side toward the outer side in the radial direction Dr. Additionally, the upstream inclined surface 45A is a curved concave surface that form a concave shape toward the downstream side. The curvature of the curved concave surface may be determined so as to follow the shape of the vortex V1.

According to the steam turbine 200 of the present embodiment described above by forming the curved concave surface as the upstream inclined surface 45A, the upstream inclined surface can be made to follow the shape of the vortex V1 formed at the inlet of the cavity. Therefore, the friction loss between the vortex V1 and the upstream inclined surface 45A can be reduced, the loss resulting from the branching of the leak flow LF is suppressed, and high performance of the steam turbine 200 can be achieved.

Third Embodiment

Next, a steam turbine (axial turbomachinery) 300 of the third embodiment of the invention will be described. Since the third embodiment described below is different from the first embodiment only in a rotor-blade housing recess 20B and a rotor blade shroud 41B, the same portions as those in the first embodiment will be described with the same reference signs, and duplicate descriptions will be omitted.

Figure 4:
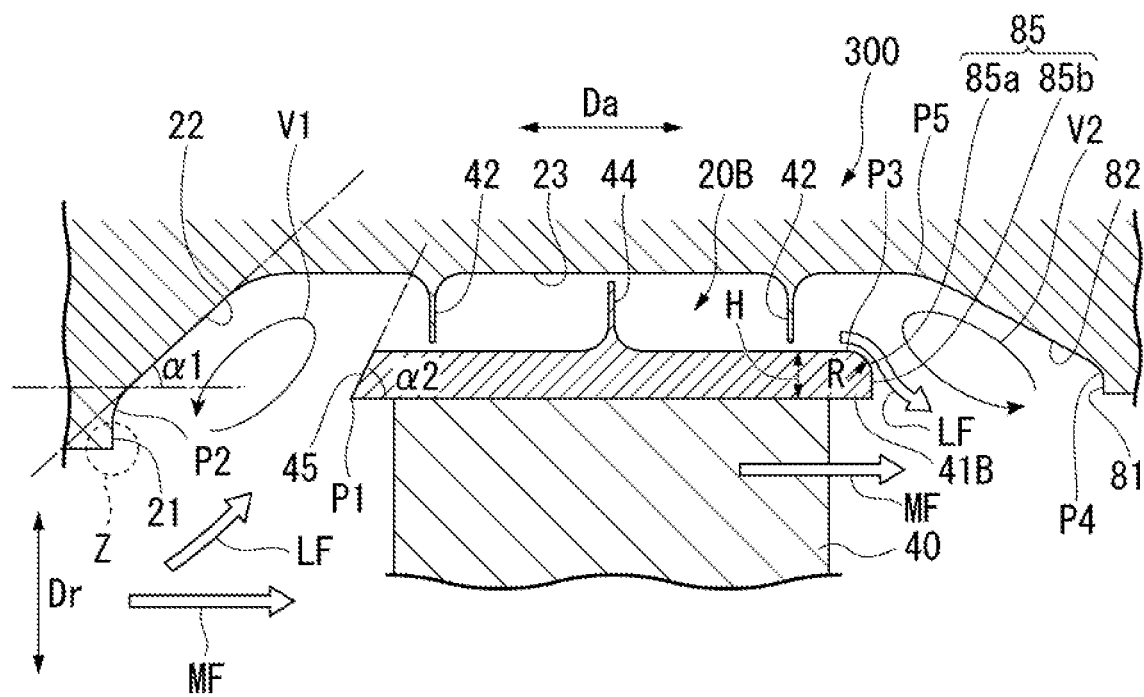
FIG. 4 is a view illustrating main parts of a steam turbine related to a third embodiment of the invention and illustrating a position equivalent to the portion X of FIG. 1.

As illustrated in FIG. 4, a surface of the rotor-blade housing recess 20B facing the upstream side, and an end surface of the rotor blade shroud 41B facing the downstream side are disposed with a gap apart in the radial direction, that is, the surface of the rotor-blade housing recess 20B facing the downstream side is disposed at a position on the downstream side of the end surface of the rotor blade shroud 41B facing the downstream side so as to face the rotor blade shroud 41B. This gap serves as an outlet part of the cavity. In the outlet part of the cavity, the leak flow LF, that is the steam that has passed through a minute gap formed between a casing fin 42 disposed on the most downstream side and the rotor blade shroud 41B, joins the main flow MF.

Also, the rotor-blade housing recess 20 that is the inner surface of the casing 2 has a flat surface 81 that extends in the radial direction Dr to be orthogonal to the central axis Ac on the inner side in the radial direction Dr as a surface facing the upstream side, a downstream inclined inner wall surface 82 that is inclined so as to face the downstream side toward the inner side in the radial direction Dr and is continuous with the outer side of the flat surface 81 in the radial direction Dr.

A connection portion between the downstream inclined inner wall surface 82 and the flat surface 81 is smoothly connected in a circular-arc shape without a corner. Additionally, a connection portion between the above bottom surface 23 of the rotor-blade housing recess 20 and the downstream inclined inner wall surface 82 is also smoothly connected in a circular-arc shape without a corner.

Here, the downstream inclined inner wall surface 82 may be formed by attaching a separate member to the rotor-blade housing recess 20B, or may be provided by forming the surface of the rotor-blade housing recess 20 in the shape of an inclined surface.

The rotor blade shroud 41B has, on an end surface faces the downstream side, a curved downstream inclined surface 85 that is inclined so as to face the downstream side toward the outer side in the radial direction Dr, and a flat surface 86 that extends in the radial direction Dr continuously with the inner side of the downstream inclined surface 85 in the radial direction Dr. The downstream inclined surface 85 is formed in the shape of a rounded surface.

In the present embodiment, an end position P3 of the downstream inclined surface 85 on the outer side in the radial direction is located radially outside an end position P4 of the downstream inclined inner wall surface 82 on the inner side in the radial direction.

An end position P5 of the downstream inclined inner wall surface 82 on the outer side in the radial direction is located downstream of an end surface of the rotor blade shroud 41B facing the downstream side.

The downstream inclined surface 85 has a curved convex surface 85a that forms a shape of a convex shape toward the downstream side, and a flat surface 85b that extends in the radial direction Dr continuously with the inner side of the curved convex surface 85a in the radial direction Dr. A planar inclined surface may be formed instead of the curved convex surface 85a.

In the present embodiment, the curved convex surface may be a rounded surface, and the curvature radius of the rounded surface may be smaller than ½ of a radial dimensions H of the end surface of the rotor blade shroud 41B facing the downstream side.

According to the steam turbine 300 of the present embodiment described above at the outlet of the cavity, the rotor blade shroud 41B is provided with the downstream inclined surface 85, and the casing 2 is provided with the downstream inclined inner wall surface 82. For this reason, when leak flow LF tries to join the main flow MF, the leak flow LF does not flow straight in the radial direction, and the leak flow LF flows obliquely into the main flow MF toward the downstream side and toward the inner side in the radial direction Dr along the downstream inclined surface 85 and the downstream inclined inner wall surface 82.

Therefore, when the leak flow LF joins the main flow MF, the flow direction of the leak flow LF and the flow direction of the main flow MF can be brought as close as possible. Moreover, since it is possible to avoid that a corner part is formed within the rotor-blade housing recess 20 by the downstream inclined surface 85 and the downstream inclined inner wall surface 82, generation of a dead wall region can be suppressed. As a result, flaking of the steam can be suppressed and loss can be reduced. Accordingly, the loss resulting from the joining of the leak flow LF to the main flow MF can be suppressed, and high performance of the steam turbine 300 can be achieved. As a result, the loss resulting from the joining of the leak flow LF to the main flow MF can be suppressed, and high performance of the steam turbine 300 is allowed.

Moreover, in the present embodiment, a vortex V2 is formed on the downstream side of the casing fin 42 at the outlet part of the cavity due to the leak flow LF that passes through a minute gap between the casing fin 42 disposed on the most downstream side and the rotor blade shroud 41B and becomes a jet stream. The vortex V2 is formed so as to extend obliquely toward the downstream side toward the inner side in the radial direction Dr along the downstream inclined surface 85 and the downstream inclined inner wall surface 82.

Also, in the present embodiment, the end position of the downstream inclined surface 85 on the outer side in the radial direction is located radially outside the end position of the downstream inclined inner wall surface 82 on the inner side in the radial direction. For this reason, the vortex V2 can be largely formed in the flow direction of the leak flow joining to the main flow at the outlet part of the cavity, formation of a fine vortex around the vortex V2 can be suppressed, and occurrence of shaft vibration in the rotating shaft 1 can be suppressed.

The steam flakes from the surface of the rotor blade shroud 41B at the outlet part of the cavity. In this case, after the leak flow LF that flows along the surface of the rotor blade shroud 41B does not flow straight in the radial direction toward the downstream side, and toward the main flow MF, but flows obliquely in the radial direction without flaking from the curved convex surface 85a to some extent, the leak flow LF can be made to join the main flow MF.

Therefore, particularly in a case in that the curvature radius of the curved convex surface 85a is smaller than ½ of the dimension H by appropriately designing the shape of the curved convex surface 85a, the leak flow LF can be made to join the main flow MF so as to follow the flow direction of the main flow MF while avoiding that the leak flow LF is made to directly flow into the stator blade 7 located on the subsequent stage side from the outlet part of the cavity. Therefore, it is possible to reduce mixed loss of the leak flow LF to the main flow MF.

Although the embodiments of the invention have been described in detail with reference to the drawings, the respective configurations and combinations thereof in the respective embodiments are examples, additions, omissions, substitutions, and other modifications of components can be made without departing from the concept of the invention. Additionally, the invention is not limited by the embodiments, and is limited by the claims.

Figure 5:
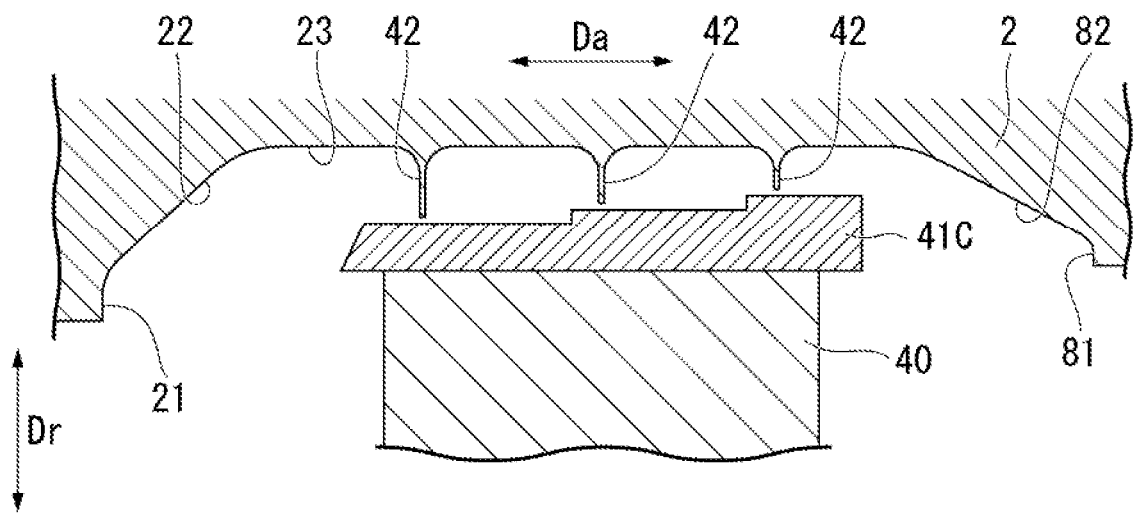
FIG. 5 is a view illustrating main parts of a steam turbine related to a modification example of the embodiment of the invention and illustrating a position equivalent to the portion X of FIG. 1.

For example, the shape of a rotor blade shroud is not limited to those of the above embodiments. That is, as illustrated in FIG. 5, the rotor blade shroud 41C may have such a step shape that the position, in of the radial direction Dr, of the surface facing the outer side in the radial direction Dr changes stepwise toward the downstream side. In this case, all fins become the casing fins 42.

In the above embodiment, the rotor-blade housing recess 20 is provided with the upstream inclined inner wall surface 22 (and the downstream inclined inner wall surface 82), and the rotor blade shroud 41 is provided with the upstream inclined surface 45 (45A) (and the downstream inclined surface 85). However, the invention is not limited to this. That is, the stator-blade housing recess 8 may be provided with an upstream inclined inner wall surface (and a downstream inclined inner wall surface), and the stator blade shroud 71 may be provided with an upstream inclined surface (and a downstream inclined surface).

The above respective embodiments and their modification examples have been described on the basis of the examples in that the steam turbine is applied as the axial turbomachinery. However, the aspect of the axial turbomachinery is not limited to the steam turbine, and other apparatuses, such as gas turbines and jet engines for aircrafts, can as the axial turbomachinery.

The configurations of the respective embodiments may be appropriately combined together.

INDUSTRIAL APPLICABILITY

According to the above axial turbomachinery by virtue of an upstream inclined surface and an upstream inclined inner wall surface at the inlet part of the cavity between the structural body and a blade, the loss resulting from the branching of the leak flow from the main flow can be suppressed, and high performance can be achieved.

REFERENCE SIGNS LIST

1: rotating shaft (structural body)
1S: outer peripheral surface
2: casing (structural body)
2S: inner peripheral surface
3: rotor blade stage
4: rotor blade (blade)
5: bearing device
5A: journal bearing
5B: thrust bearing
6: stator blade stage
7: stator blade (blade)
8: stator-blade housing recess
20, 20B: rotor-blade housing recess
21: flat surface
22: upstream inclined inner wall surface
23: bottom surface
40: rotor blade main body
41, 41B, 41C: rotor blade shroud
42: casing fin (contraction flow member)
43: platform
44: shroud fin
45, 45A: upstream inclined surface
70: stator blade main body
71: stator blade shroud
81: flat surface
82: downstream inclined inner wall surface
85: downstream inclined surface
85a: curved convex surface
85b: flat surface
100, 200, 300: steam turbine (axial turbomachinery)
V1, V2: vortex
Ac: central axis
Da: central axis direction
Dr: radial direction
MF: main flow
LF: leak flow

The invention claimed is:

1. An axial turbomachinery comprising:
a blade that is disposed in a flow channel through which a main flow of a fluid flows and has a shroud at a distal end thereof; and
a structural body that is provided via a gap on a distal side of the blade and is configured to rotate relative to the blade,
wherein the structural body has a contraction flow member that protrudes toward the shroud to form a minute gap between the contraction flow member and the shroud,
wherein the blade has an upstream inclined surface on an end surface of the shroud facing the upstream side, the upstream inclined surface being inclined from an upstream side to a downstream side toward a radially outer side,
wherein the structural body is provided with an upstream inclined inner wall surface that is disposed on the upstream side of the shroud and is inclined from the upstream side toward the downstream side toward a radially outer side, at a position facing the shroud in a direction in which the main flow flows,
wherein an inclination angle of the upstream inclined surface with respect to a central axis of relative rotation between the blade and the structural body is larger than an inclination angle of the upstream inclined inner wall surface with respect to the central axis, and
wherein an end position of the upstream inclined surface on the radially inner side is located radially outside an end position of the upstream inclined inner wall surface on the radially inner side, wherein the upstream inclined surface has a curved concave surface that forms a concave shape toward the downstream side.

2. An axial turbomachinery comprising:

a blade that is disposed in a flow channel through which a main flow of a fluid flows and has a shroud at a distal end thereof; and a structural body that is provided via a gap on a distal side of the blade and is configured to rotate relative to the blade, wherein the structural body has a contraction flow member that protrudes toward the shroud to form a minute gap between the contraction flow member and the shroud, wherein the blade has an upstream inclined surface on an end surface of the shroud facing the upstream side, the upstream inclined surface being inclined from an upstream side to a downstream side toward a radially outer side, wherein the structural body is provided with an upstream inclined inner wall surface that is disposed on the upstream side of the shroud and is inclined from the upstream side toward the downstream side toward a radially outer side, at a position facing the shroud in a direction in which the main flow flows, wherein an inclination angle of the upstream inclined surface with respect to a central axis of relative rotation between the blade and the structural body is larger than an inclination angle of the upstream inclined inner wall surface with respect to the central axis, and wherein an end position of the upstream inclined surface on the radially inner side is located radially outside an end position of the upstream inclined inner wall surface on the radially inner side, wherein the blade has a downstream inclined surface on an end surface of the shroud facing the downstream side, the downstream inclined surface being inclined from the upstream side to the downstream side toward the radially inner side, and wherein the structural body is provided with a downstream inclined inner wall surface that is disposed on the downstream side of the shroud and is inclined from the upstream side toward the downstream side toward the radially inner side, at a position facing the shroud in the direction in which the main flow flows.

3. The axial turbomachinery according to claim 2, wherein an end position of the downstream inclined surface on the radially outer side is located radially outside an end position of the downstream inclined inner wall surface on the radially inner side.

4. The axial turbomachinery according to claim 2, wherein the downstream inclined surface has a curved convex surface that forms a convex shape toward the downstream side.

5. The axial turbomachinery according to claim 4, wherein the curved convex surface is a rounded surface, and a curvature radius of the rounded surface is smaller than ½ of the radial dimension of the end surface of the shroud facing the downstream side.

* * * * *